United States Patent
Daily et al.

(10) Patent No.: US 11,579,021 B2
(45) Date of Patent: Feb. 14, 2023

(54) THERMAL MONITORING DEVICE FOR CHARGING SYSTEM

(71) Applicant: TE Connectivity Services GmbH, Schaffhausen (CH)

(72) Inventors: Christopher George Daily, Harrisburg, PA (US); Matthew Edward Mostoller, Hummelstown, PA (US); Edward John Howard, Millersburg, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 298 days.

(21) Appl. No.: 16/855,322

(22) Filed: Apr. 22, 2020

(65) Prior Publication Data

US 2021/0333156 A1    Oct. 28, 2021

(51) Int. Cl.
| | |
|---|---|
| *G01K 1/14* | (2021.01) |
| *H01R 13/631* | (2006.01) |
| *H01R 13/66* | (2006.01) |
| *H02J 7/00* | (2006.01) |
| *G01K 7/22* | (2006.01) |

(52) U.S. Cl.
CPC .............. *G01K 1/14* (2013.01); *H01R 13/631* (2013.01); *H01R 13/6683* (2013.01); *H02J 7/0045* (2013.01); *H02J 7/0047* (2013.01); *G01K 7/22* (2013.01)

(58) Field of Classification Search
CPC .......... G01K 1/14; G01K 7/22; H01R 13/631; H01R 13/6683; H02J 7/0045; H02J 7/0047; H02J 7/00309; H02J 7/0042
See application file for complete search history.

(56) References Cited

U.S. PATENT DOCUMENTS

| | | | |
|---|---|---|---|
| 8,002,574 B1 | 8/2011 | Yi | |
| 9,559,461 B1 | 1/2017 | Diehr | |
| 2015/0171646 A1* | 6/2015 | Pham | ......................... B60L 3/00 |
| | | | 320/109 |
| 2018/0062420 A1* | 3/2018 | Isaac | ..................... H01F 27/363 |

(Continued)

FOREIGN PATENT DOCUMENTS

| | | |
|---|---|---|
| CN | 210 074 317 U | 2/2020 |
| DE | 10 2018 211698 A1 | 1/2020 |
| WO | 2018/105809 A1 | 6/2018 |

OTHER PUBLICATIONS

International Search Report, International Application No. PCT/IB2021/053249, International Filing Date, dated Apr. 20, 2021.

*Primary Examiner* — Akm Zakaria

(57) ABSTRACT

A charging device for charging a mobile device using a charging component includes a power connector and a thermal monitoring device. The power connector includes a housing having an end wall between a front and a rear. The housing includes power contact channels with power contacts received therein. The thermal monitoring device is coupled to the end wall of the housing. The thermal monitoring device includes a substrate, a mating connector mounted to the substrate, and a temperature sensor mounted to the substrate. The temperature sensor is electrically connected to the mating connector being positioned in close proximity with at least one of the power contacts such that the temperature sensor is in thermal communication with the power contact for monitoring the temperature of the power contact.

20 Claims, 9 Drawing Sheets

(56) References Cited

U.S. PATENT DOCUMENTS

| | | |
|---|---|---|
| 2019/0227245 A1 | 7/2019 | Miller et al. |
| 2020/0044482 A1* | 2/2020 | Partovi ................. H02J 7/0047 |
| 2020/0094689 A1 | 3/2020 | Myer et al. |
| 2021/0237598 A1* | 8/2021 | Helnerus ................. B60L 53/31 |
| 2021/0370785 A1* | 12/2021 | Malandain ......... H01R 13/6658 |

* cited by examiner

THERMAL MONITORING DEVICE FOR CHARGING SYSTEM

BACKGROUND OF THE INVENTION

The subject matter herein relates generally to charging systems for mobile devices.

Mobile devices, such as autonomous mobile robots, are movable within an environment to perform a task. However, the mobile devices need to be recharged from time to time. The mobile devices are returned to a charging device to supply power to the mobile device and recharge the batteries of the mobile device. During charging, the temperature of the components is increased and may be subject to excessive heating. Excessive heating of the components may lead damage or rapid deterioration of the components, such as to plating of the contacts.

A need remains for an improved charging system.

BRIEF DESCRIPTION OF THE INVENTION

In one embodiment, a charging device is provided for charging a mobile device using a charging component includes a power connector and a thermal monitoring device. The power connector includes a housing extending between a front and a rear having an end wall extending between the front and the rear. The housing includes power contact channels extending therethrough between the front and the rear with power contacts received therein. The housing includes a guide member configured to guide mating between the mobile device and the charging component. The thermal monitoring device is coupled to the end wall of the housing. The thermal monitoring device includes a substrate, a mating connector mounted to the substrate, and a temperature sensor mounted to the substrate. The temperature sensor is electrically connected to the mating connector being positioned in close proximity with at least one of the power contacts such that the temperature sensor is in thermal communication with the power contact for monitoring the temperature of the power contact.

In an embodiment, a charging system is provided including a mobile charging device and a supply charging device. The mobile charging device includes a receiver power connector having a receiver housing extending between a front and a rear and having a receiver flange configured to be mounted to a body of a mobile device. The receiver housing has a receiver base extending rearward from the receiver flange through a body cutout in the body of the mobile device. The receiver housing includes receiver power contact channels extending through the receiver base. The receiver housing includes a funnel having an opening having angled guide walls between the opening and a receptacle at the receiver base. The receiver power connector includes receiver power contacts received in the receiver power contact channels extending into the receptacle. The supply charging device includes a supply power connector having a supply housing extending between a front and a rear having a supply flange configured to be mounted to a panel of a charging component. The supply housing has a supply base extending rearward from the supply flange through a panel cutout in the panel. The supply housing includes supply power contact channels extending through the supply base. The supply housing includes a guide member extending forward from the flange being received in the funnel of the receiver housing through the opening to locate the supply charging device relative to the mobile charging device. The supply power connector includes supply power contacts received in the supply power contact channels. The mating end of the supply power connector is received in the receptacle such that the supply power contacts are mated to the receiver power contacts. The charging system includes a thermal monitoring device coupled to either the receiver base of the receiver housing or the supply base of the supply housing. The thermal monitoring device includes a substrate, a mating connector mounted to the substrate, and a temperature sensor mounted to the substrate. The temperature sensor is electrically connected to the mating connector and positioned in close proximity with the corresponding receiver power contact or the supply power contact for monitoring the temperature of the receiver power contact or the supply power contact.

In an embodiment, an autonomous mobile device is provided including a mobile body movable relative to a supply charging device to perform a task and return to the supply charging device to recharge the autonomous mobile device and a mobile charging device mounted to the mobile body. The mobile charging device is mated to the supply charging device to recharge the autonomous mobile device. The mobile charging device includes a receiver power connector having a receiver housing extending between a front and a rear. The receiver power connector has a mating end at the front. The receiver housing has a receiver flange mounted to the mobile body and a receiver base extending rearward from the receiver flange through a body cutout in the mobile body. The receiver housing includes receiver power contact channels extending through the receiver base. The receiver housing includes a funnel having an opening having angled guide walls between the opening and a receptacle at the receiver base. The receiver power connector includes receiver power contacts received in the receiver power contact channels extending into the receptacle. The mobile charging device is coupled to the receiver base of the receiver housing. The thermal monitoring device includes a substrate, a mating connector mounted to the substrate, and a temperature sensor mounted to the substrate. The temperature sensor is electrically connected to the mating connector. The temperature sensor is positioned in close proximity with at least one of the receiver power contacts such that the temperature sensor is in thermal communication with the receiver power contact for monitoring the temperature of the receiver power contact.

DETAILED DESCRIPTION OF THE INVENTION

Figure 1:
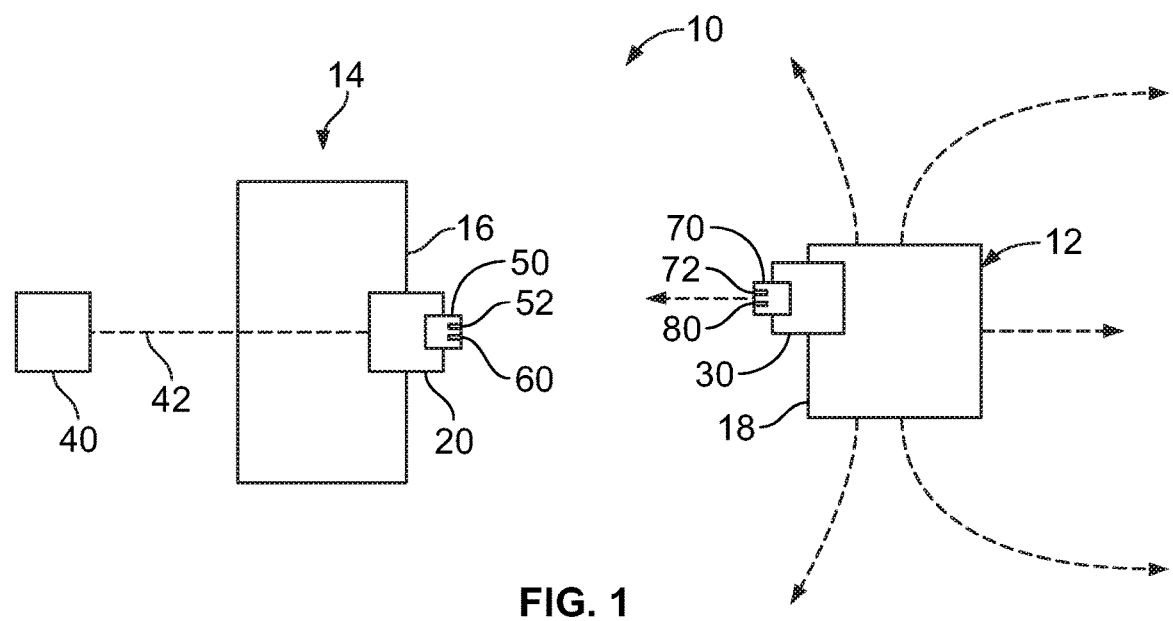
FIG. 1 illustrates a charging system for charging a mobile device in accordance with an exemplary embodiment.

FIG. 1 illustrates a charging system 10 for charging a mobile device 12 in accordance with an exemplary embodiment. The charging system 10 includes a supply charging device 20 and a mobile charging device 30. The mobile charging device 30 is provided on the mobile device 12. The supply charging device 20 is provided on a charging component 14. The charging component 14 may be fixed, such as to a wall or panel 16. In other various embodiments, the charging component 14 may be a movable charging component, such as a charging station. The charging component 14 may be provided in a room or building in a fixed location and the mobile device 12 may be separated from the charging component 14 and returned to the charging component 14 to recharge the mobile device 12. The supply charging device 20 receives power from a power supply 40, such as via a power wires 42 routed between the power supply 40 and the supply charging device 20.

In an exemplary embodiment, the mobile device 12 is an autonomous mobile device that is movable within an environment to perform a task and return to the supply charging device 20 to charge the autonomous mobile device 12. For example, the mobile charging device 30 may be mated to the supply charging device 20 to recharge the mobile device 12. In various embodiments, the mobile device 12 may be a mobile robot, such as for used to perform tasks in a factory, a hotel, a store or another environment. For example, the mobile robot may be used to scan items on shelves, deliver items from one location to another location, or perform other tasks. The mobile charging device 30 is mounted to a body 18 of the mobile device 12. In various embodiments, the mobile charging device 30 may have a limited amount of floating movement relative to the body 18 to align the mobile charging device 30 relative to the supply charging device 20 during mating.

In an exemplary embodiment, the supply charging device 20 is capable of accommodating misalignment of the mobile charging device 30 when the mobile device 12 returns to the charging component 14 by moving or floating relative to the panel 16 to align the supply charging device 20 with the mobile charging device 30. The supply charging device 20 may allow floating movement relative to the panel 16 of approximately 10 mm or more.

In an exemplary embodiment, the supply charging device 20 includes a supply power connector 50 having supply power contacts 52 configured to be electrically connected to the mobile charging device 30 to charge the mobile device 12. In an exemplary embodiment, the supply charging device 20 includes a thermal monitoring device 60 for monitoring temperatures of one or more of the supply power contacts 52, such as to prevent overheating of the components or damage to the components. For example, the thermal monitoring device 60 may include a temperature sensor for sensing temperatures of the supply power contacts 52. The supply charging device 20 may be controlled based on input from the thermal monitoring device 60. For example, the charging process may be stopped if the sensed temperature exceeds a threshold temperature. In other various embodiments, the charging rate may be reduced, such as lowering the charging amps or voltage to reduce the temperature of the supply power contacts 52.

In an exemplary embodiment, the mobile charging device 30 includes a receiver power connector 70 having receiver power contacts 72 configured to be electrically connected to the supply power contacts 52 to charge the mobile device 12. In an exemplary embodiment, the mobile charging device 30 includes a thermal monitoring device 80 for monitoring temperatures of one or more of the receiver power contacts 72, such as to prevent overheating of the components or damage to the components. For example, the thermal monitoring device 80 may include a temperature sensor for sensing temperatures of the receiver power contacts 72. The mobile charging device 30 may be controlled based on input from the thermal monitoring device 80. For example, the charging process may be stopped if the sensed temperature exceeds a threshold temperature. In other various embodiments, the charging rate may be reduced, such as lowering the charging amps or voltage to reduce the temperature of the receiver power contacts 72.

Figure 2:
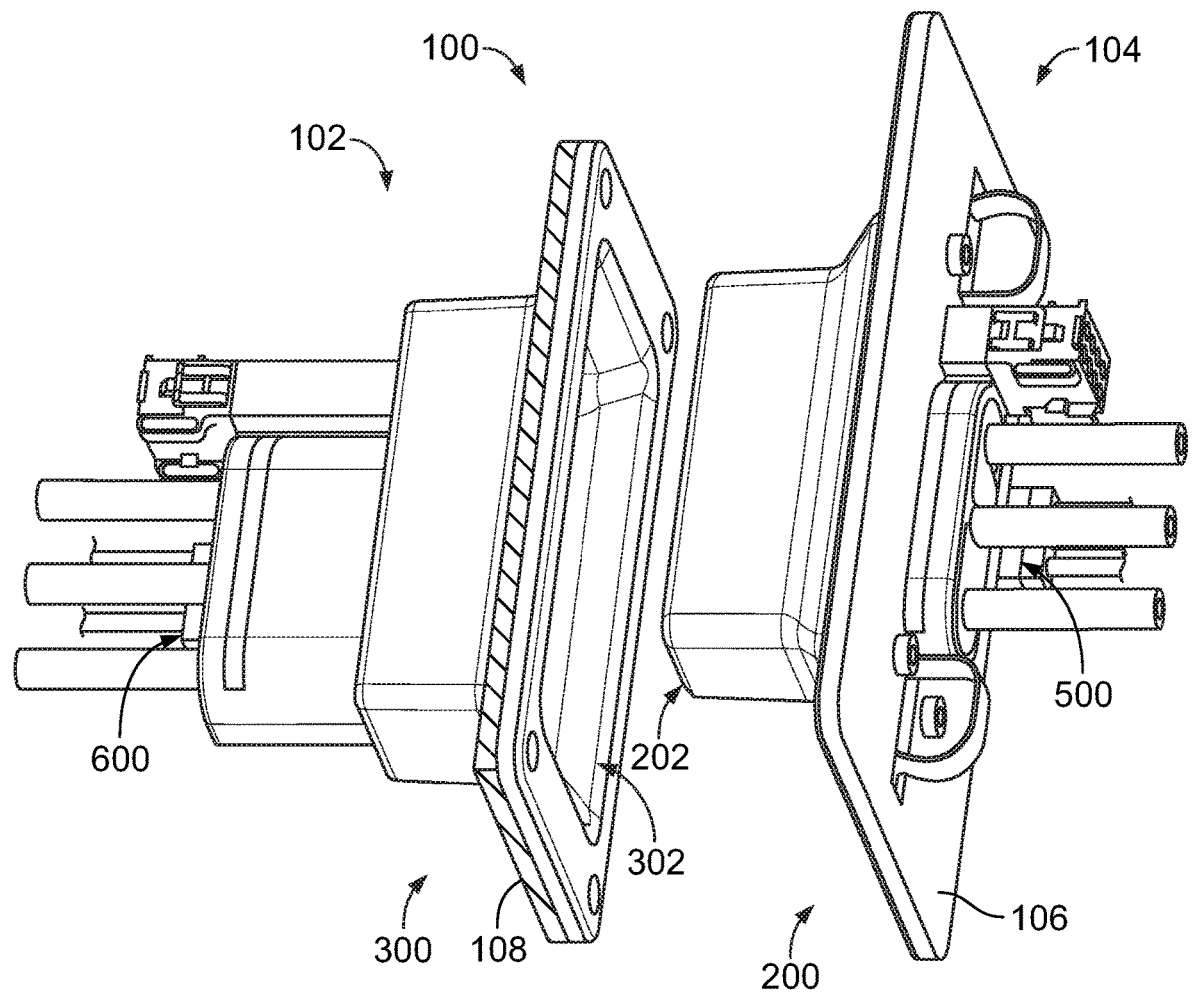
FIG. 2 illustrates a charging system in accordance with an exemplary embodiment including a supply charging device and a mobile charging device in accordance with an exemplary embodiment.
Figure 3:
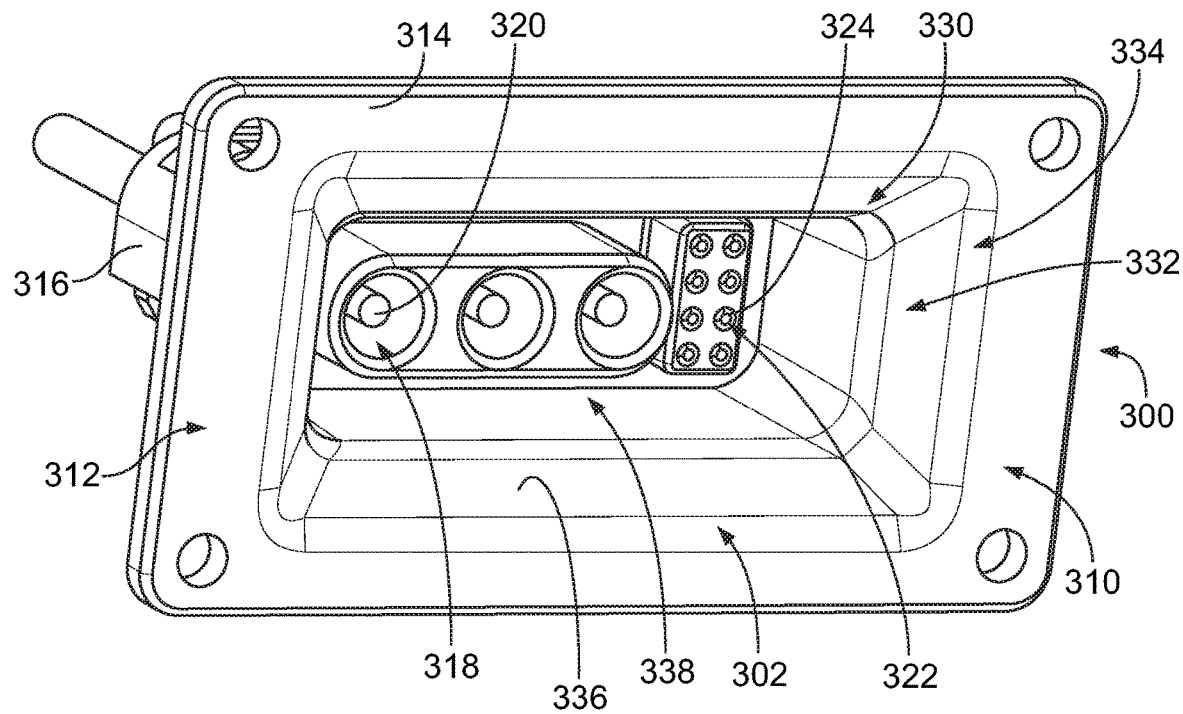
FIG. 3 is a front perspective view of the mobile charging device in accordance with an exemplary embodiment.
Figure 4:
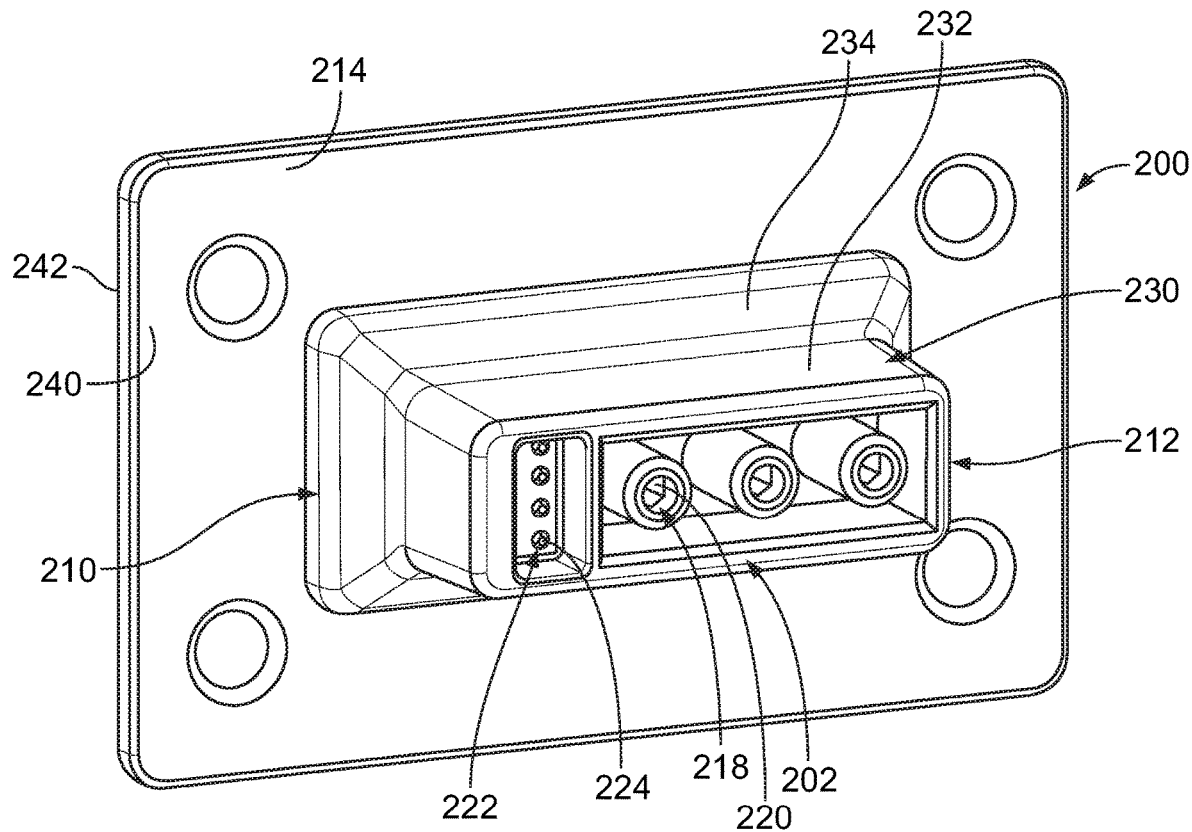
FIG. 4 is a front perspective view of the supply charging device in accordance with an exemplary embodiment.

FIG. 2 illustrates a charging system 100 in accordance with an exemplary embodiment including a supply charging device 200 and a mobile charging device 300. FIG. 3 is a front perspective view of the mobile charging device 300 in accordance with an exemplary embodiment. FIG. 4 is a front perspective view of the supply charging device 200 in accordance with an exemplary embodiment.

The charging system 100 is used for charging a mobile device 102 using a charging component 104. The mobile charging device 300 is provided on the mobile device 102 and includes a mating end 302 configured to be mated with the supply charging device 200. The supply charging device 200 is provided on the charging component 104 and includes a mating end 202 configured to be mated with the mobile charging device 300. The supply charging device 200 is coupled to a panel 106 (FIG. 2) of the charging component 104. The mobile charging device 300 is coupled to a body 108 (FIG. 2) of the mobile device 102. The mobile device 102 is configured to be separated from the charging component 104 and returned to the charging component 104 to recharge the mobile device 102. The mobile charging device 300 receives power from the supply charging device 200 when coupled thereto.

In an exemplary embodiment, the supply charging device 200 includes a thermal monitoring device 500 for monitoring temperatures of the supply power contacts of the supply charging device to prevent overheating of the components or damage to the components. For example, the thermal monitoring device 500 may include a temperature sensor for sensing temperatures of the supply power contacts. The supply charging device 200 may be controlled based on input from the thermal monitoring device 500. For example, the charging process may be stopped if the sensed temperature exceeds a threshold temperature. In other various embodiments, the charging rate may be reduced, such as lowering the charging amps or voltage to reduce the temperature of the supply power contacts.

In an exemplary embodiment, the mobile charging device 300 includes a thermal monitoring device 600 for monitoring temperatures of the receiver power contacts to prevent overheating of the components or damage to the components. For example, the thermal monitoring device 600 may include a temperature sensor for sensing temperatures of the receiver power contacts. The mobile charging device 300 may be controlled based on input from the thermal monitoring device 600. For example, the charging process may be stopped if the sensed temperature exceeds a threshold temperature. In other various embodiments, the charging rate may be reduced, such as lowering the charging amps or voltage to reduce the temperature of the receiver power contacts.

With reference to FIG. 3, the mobile charging device 300 includes a receiver power connector 310 having a receiver housing 312. The receiver housing 312 has a receiver flange 314 configured to be mounted to the body 108 of the mobile device 102. The receiver housing 312 has a receiver base 316 including receiver power contact channels 318 that hold receiver power contacts 320. In the illustrated embodiment, the receiver power contacts 320 are illustrated as pin contacts; however, other types of power contacts may be used in alternative embodiments, such as blades, sockets, spring beams, and the like. The receiver housing 312 includes receiver signal contact channels 322 that hold receiver signal contacts 324. However, the receiver power connector 310 may be provided without the receiver signal contacts 324 in alternative embodiments.

The receiver housing 312 includes a guide feature 330 to guide mating of the mobile charging device 300 with the supply charging device 200. In an exemplary embodiment, the guide feature 330 includes a funnel 332 having an opening 334. The funnel 332 has angled guide walls 336 between the opening 334 and a receptacle 338 at the receiver base 316. The receiver power contacts 320 extend into the receptacle 338 for mating with the supply charging device 200. The guide walls 336 guide alignment of the supply charging device 200 and the mobile charging device 300 with the mobile device 102 returns to the charging component 104. The funnel 332 accommodates horizontal misalignment (for example, misalignment from either side) and accommodates vertical misalignment (for example, misalignment from above or from below).

With reference to FIG. 4, the supply charging device 200 includes a supply power connector 210 having a supply housing 212. The supply housing 212 has a supply flange 214 configured to be mounted to the panel 106. The supply housing 212 includes supply power contact channels 218 that receive supply power contacts 220. The supply housing 212 includes supply signal contact channels 222 that receive supply signal contacts 224. In the illustrated embodiment, the supply power contacts 220 are illustrated as socket contacts; however, other types of power contacts may be used in alternative embodiments, such as pins, blades, spring beams, and the like. The supply power contact 220 and the supply signal contact 224 are configured to be electrically connected to the receiver power contacts 320 and the receiver signal contacts 324 when the mobile charging device 300 is mated with the supply charging device 200.

The supply housing 212 includes a guide member 230 extending forward from the flange 214. The guide member 230 is configured to be received in the funnel 332 of the receiver housing 312 through the opening 334 to locate the supply charging device 200 relative to the mobile charging device 300. In an exemplary embodiment, the guide member 230 includes a nose 232 and a cone 234 extending between the nose 232 and the flange 214. The nose 232 is configured to be received in the receptacle 338.

Figure 5:
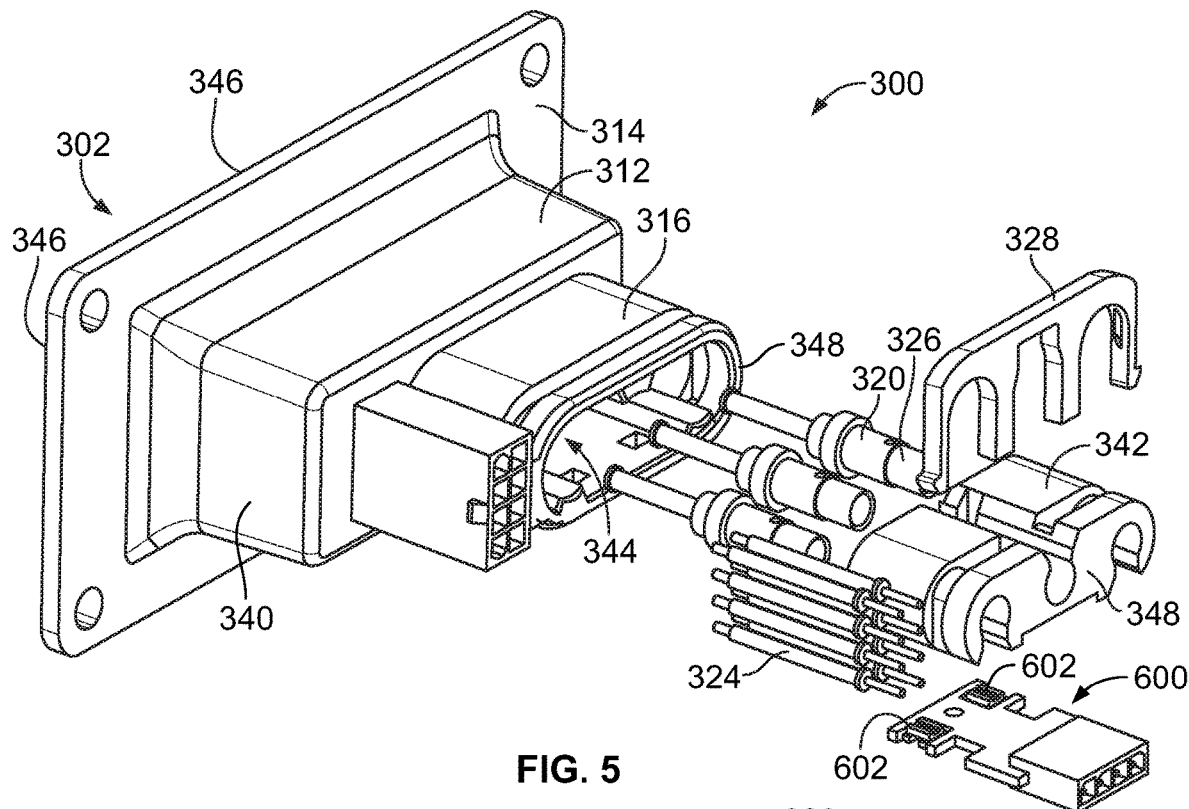
FIG. 5 is a rear perspective, exploded view of the mobile charging device in accordance with an exemplary embodiment.

FIG. 5 is a rear perspective, exploded view of the mobile charging device 300 in accordance with an exemplary embodiment. In an exemplary embodiment, the receiver housing 312 is a multi-piece housing. For example, the receiver housing 312 includes an outer housing 340 and an inner housing 342 received in a cavity 344 of the outer housing 340. In alternative embodiments, the receiver housing 312 is a single-piece housing. The housing 312 extends between a front 346 and a rear 348. The mating end 302 is provided at the front 346 of the receiver housing 312. The receiver base 316 extends rearward from the receiver flange 314 to the rear 348 of the receiver housing 312. In the illustrated embodiment, the receiver signal contacts 324 are pogo contacts; however, other types of contact may be used in alternative embodiments.

The receiver base 316 receives the inner housing 342 in the cavity 344 of the receiver base 316. The inner housing 342 holds the receiver power contacts 320. Power wires 326 extend from the receiver power contacts 320 and the inner housing 342. In the illustrated embodiment, the receiver power contacts 320 are configured be side loaded into corresponding contact channels in the inner housing 342, such as through the top side and/or the bottom side of the inner housing 342. In alternative embodiments, the receiver power contacts 320 may be end loaded into the inner housing 342, such as through the rear end of the inner housing 342. In an exemplary embodiment, a locking device 328 is used to lock the receiver power contacts 320 in the inner housing 342 and/or to lock the inner housing 342 in the outer housing 340 or other mounting structure. The inner housing 342, with the receiver power contacts 320 loaded therein and the power wires 326 extending therefrom, is configured to be rear loaded into the cavity 344 of the receiver base 316. The locking device 328 is then coupled to the receiver base 316 to lock the inner housing 342 in the cavity 344 and to lock the receiver power contacts 320 in the inner housing 342.

The thermal monitoring device 600 is configured to be mounted to the receiver housing 312, such as to the inner housing 342. The thermal monitoring device 600 includes temperature sensors 602 for monitoring temperatures of the receiver power contacts 320 to prevent overheating of the components or damage to the components. The thermal monitoring device 600 may include a single temperature sensor 602 or multiple temperature sensors 602. The thermal monitoring device 600 may monitor the temperature of one of the receiver power contacts 320 or multiple receiver power contacts 320 in various embodiments.

Figure 6:
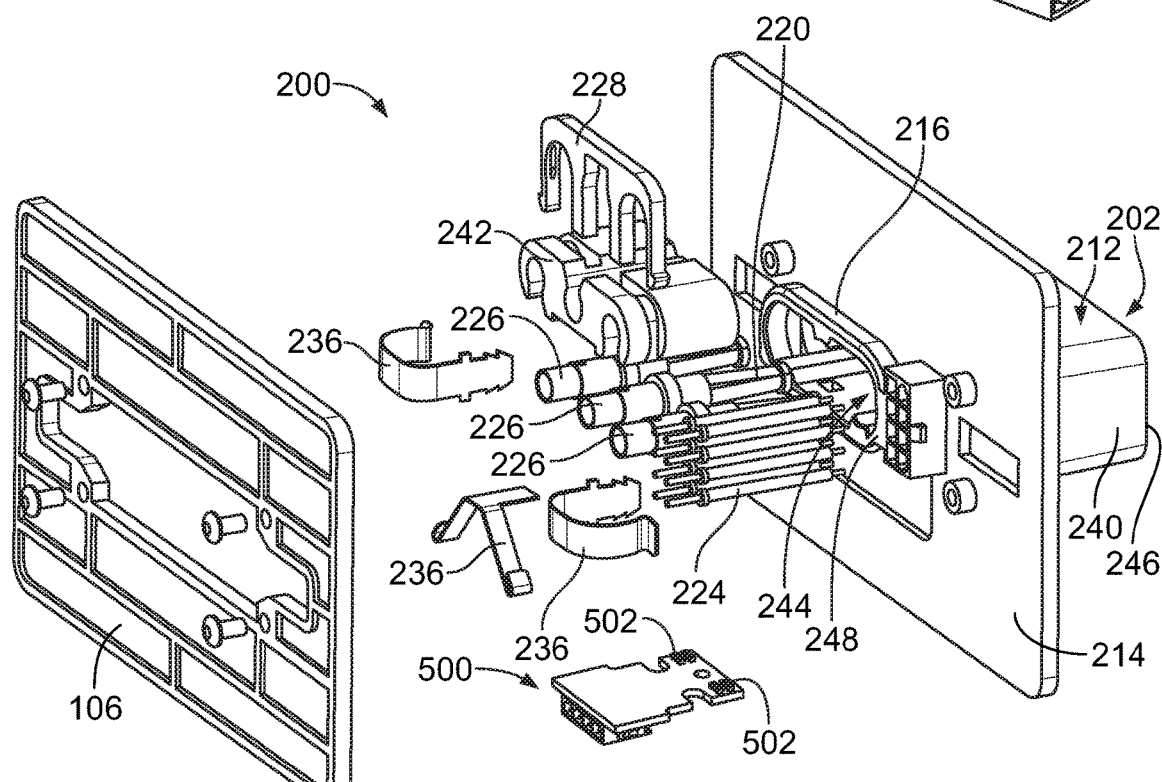
FIG. 6 is a rear perspective, exploded view of the supply charging device in accordance with an exemplary embodiment.

FIG. 6 is a rear perspective, exploded view of the supply charging device 200 in accordance with an exemplary embodiment. In an exemplary embodiment, the supply housing 212 is a multi-piece housing. For example, the supply housing 212 includes an outer housing 240 and an inner housing 242 received in a cavity 244 of the outer housing 240. In alternative embodiments, the supply housing 212 is a single-piece housing. The housing 212 extends between a front 246 and a rear 248. The mating end 202 is provided at the front 246 of the supply housing 212. The supply base 216 extends rearward from the supply flange 214 to the rear 248 of the supply housing 212. In the illustrated embodiment, the supply signal contacts 224 are pogo contacts; however, other types of contact may be used in alternative embodiments.

The supply base 216 receives the inner housing 242 in the cavity 244 of the supply base 216. The inner housing 242 holds the supply power contacts 220. Power wires 226 extend from the supply power contacts 220 and the inner housing 242. In the illustrated embodiment, the supply power contacts 220 are configured be side loaded into corresponding contact channels in the inner housing 242, such as through the top side and/or the bottom side of the inner housing 242. In alternative embodiments, the supply power contacts 220 may be end loaded into the inner housing 242, such as through the rear end of the inner housing 242. In an exemplary embodiment, a locking device 228 is used to lock the supply power contacts 220 in the inner housing 242 and/or to lock the inner housing 242 in the outer housing 240 or other mounting structure. The inner housing 242, with the supply power contacts 220 loaded therein and the power wires 226 extending therefrom, is configured to be rear loaded into the cavity 244 of the supply base 216. The locking device 228 is then coupled to the supply base 216 to lock the inner housing 242 in the cavity 244 and to lock the supply power contacts 220 in the inner housing 242.

In an exemplary embodiment, the supply charging device 200 includes locating springs 236 configured to be coupled to the supply housing 212. The locating springs 236 are configured to be coupled to the panel 106 to allow the supply housing 212 to move relative to the panel 106. For example, the supply housing 212 may have a limited amount of floating movement relative to the panel 106 for mating with the mobile charging device 300 (shown in FIG. 5). The supply housing 212 is movable to accommodate misalignment of the mobile charging device 300 relative to the supply charging device 200.

The thermal monitoring device 500 is configured to be mounted to the supply housing 212, such as to the inner housing 242. The thermal monitoring device 500 includes temperature sensors 502 for monitoring temperatures of the supply power contacts 220 to prevent overheating of the components or damage to the components. The thermal monitoring device 500 may include a single temperature sensor 502 or multiple temperature sensors 502. The thermal monitoring device 500 may monitor the temperature of one of the supply power contacts 220 or multiple supply power contacts 220 in various embodiments.

Figure 7:
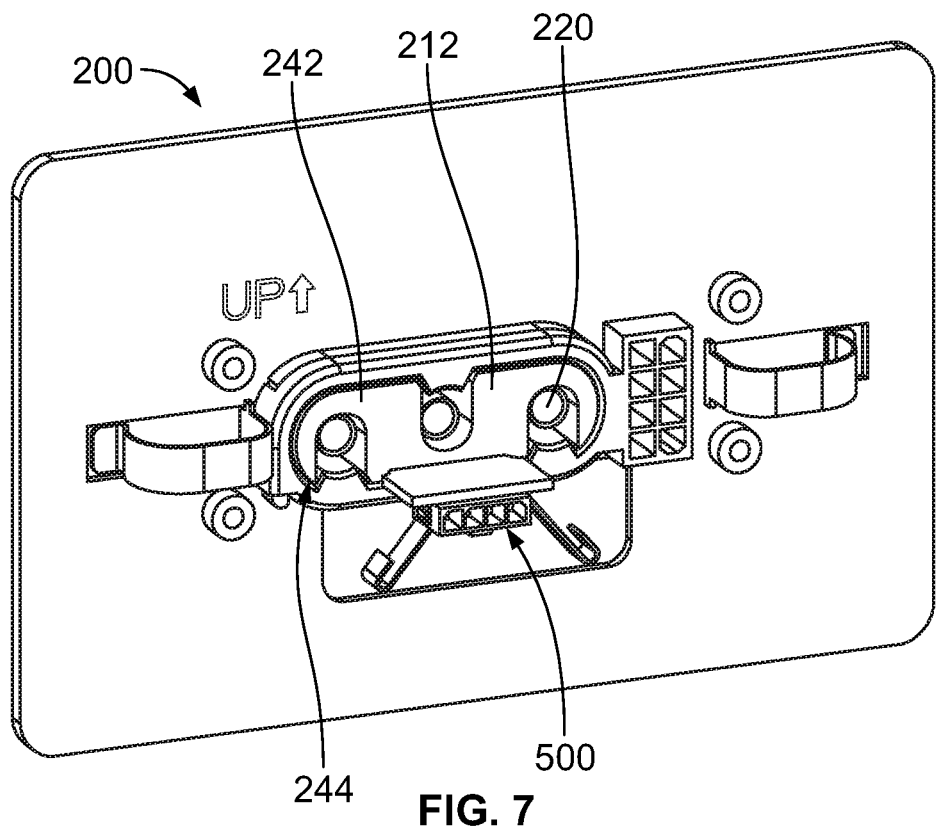
FIG. 7 is a rear view of the supply charging device in accordance with an exemplary embodiment.

FIG. 7 is a rear view of the supply charging device 200 in accordance with an exemplary embodiment. FIG. 7 shows the thermal monitoring device 500 coupled to the housing 212 for monitoring the temperature of the supply power contacts 220. The inner housing 242 is shown in the cavity 244 of the outer housing 240.

Figure 8:
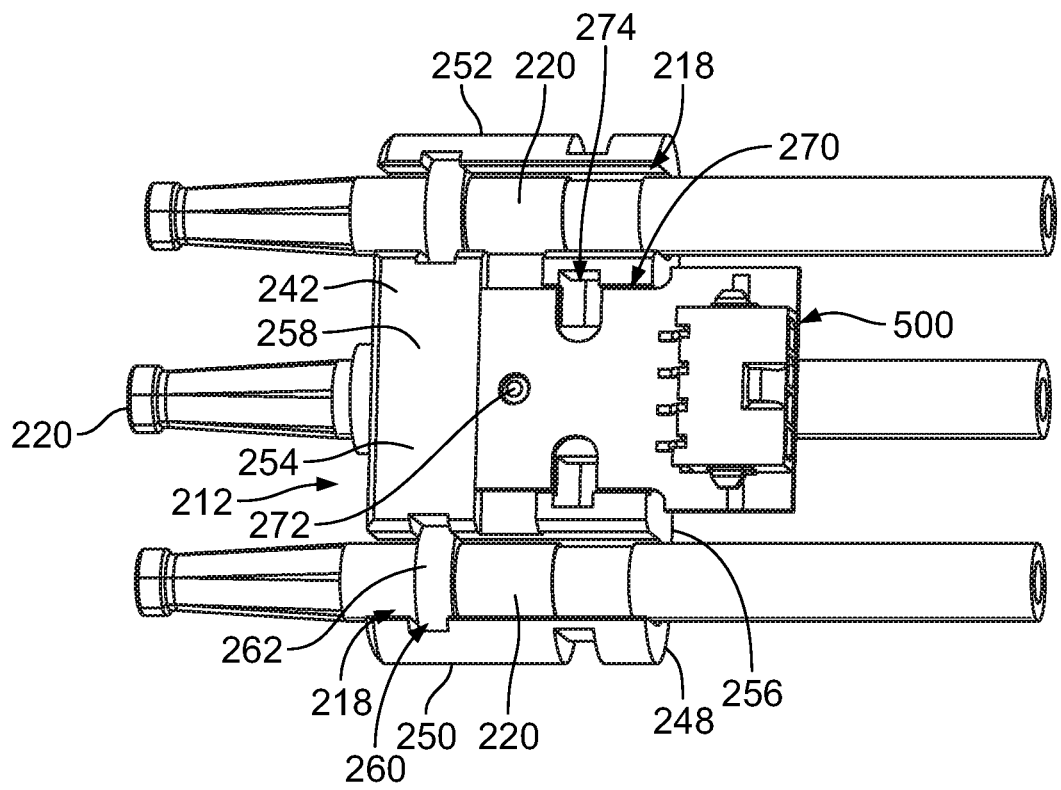
FIG. 8 is a top view of a portion of the supply charging device in accordance with an exemplary embodiment.

FIG. 8 is a top view of a portion of the supply charging device 200 in accordance with an exemplary embodiment. FIG. 8 shows the supply power contacts 220 received in the supply power contact channels 218 of the supply housing 212, such as the inner housing 242. The thermal monitoring device 500 is coupled to the inner housing 242 for monitoring the temperature of the supply power contacts 220.

The housing 212 (for example, the inner housing 242) includes a first side 250 and a second side 252 extending between the front 246 and the rear 248. The housing 212 includes a first end wall 254 and a second end wall 256 extending between the sides 250, 252 and between the front 246 and the rear 248. The first end wall 254 may be a top and the second end wall 256 may be a bottom. In various embodiments, the end wall 254 includes a flat pad 258. The thermal monitoring device 500 is coupled to the end wall 254, such as at the pad 258.

In an exemplary embodiment, the supply power contact channels 218 include openings open at the end wall 254 to receive the supply power contacts 220. In various embodiments, the supply power contact channels 218 are located proximate to the sides 250, 252. In various embodiments, the second end wall 256 may include an opening to at least one supply power contact channel 218. Such supply power contact channel 218 may be approximately centered between the sides 250, 252. Other locations of the supply power contact channels 218 may be possible in alternative embodiments. The supply power contact channels 218 may include locating features 260 for locating the supply power contacts 220 in the supply power contact channels 218. For example, the locating features 260 may be slots or channels that receive a flange 262 of the supply power contact 220 to axially position the supply power contact 220 in the supply power contact channel 218.

In an exemplary embodiment, the housing 242 includes a thermal monitoring device pocket 270 at the end wall 254 that receives the thermal monitoring device 500. The thermal monitoring device pocket 270 may be located at the rear 248. The thermal monitoring device 500 may extend from the thermal monitoring device pocket 270 rearward of the rear 248 of the housing 242. In an exemplary embodiment, the housing 242 includes a locating post 272 in the thermal monitoring device pocket 270 for locating the thermal monitoring device 500 within the thermal monitoring device pocket 270. Other types of locating features may be used in alternative embodiments. For example, shoulders or walls forming the thermal monitoring device pocket 270 may be used for locating the thermal monitoring device 500 in the thermal monitoring device pocket 270. In an exemplary embodiment, the housing 242 includes openings 274, such as between the end walls 254, 256, configured to receive the locking device 228 (shown in FIG. 6).

Figure 9:
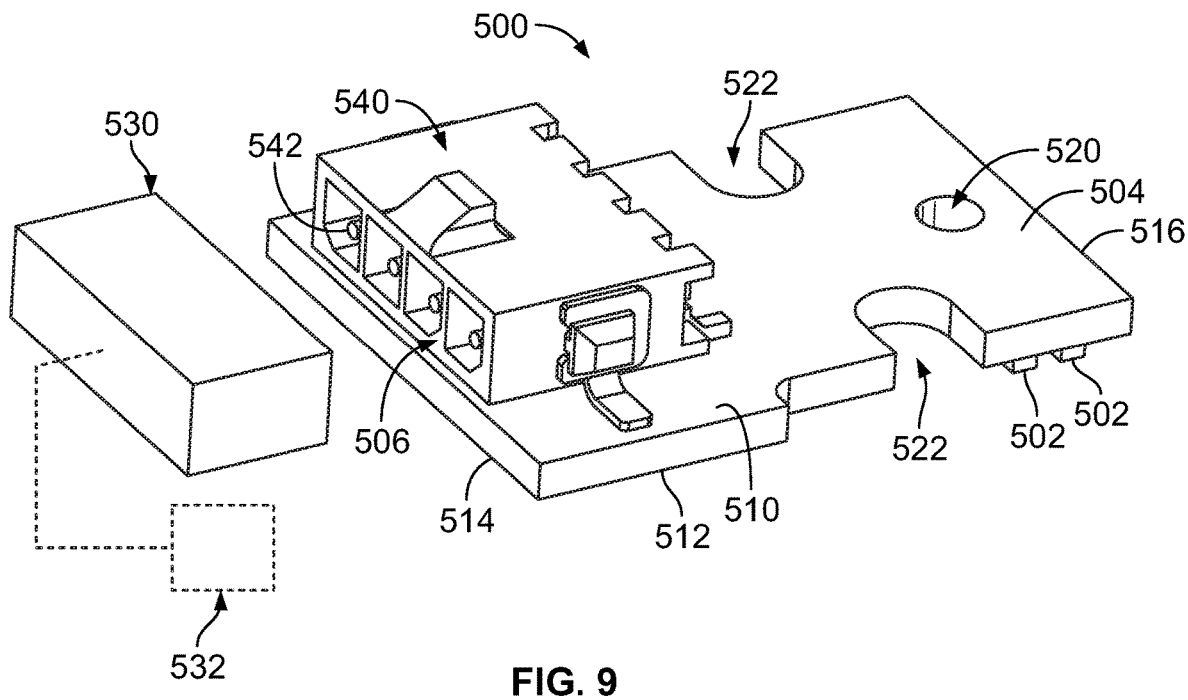
FIG. 9 is a top perspective view of a thermal monitoring device of the supply charging device in accordance with an exemplary embodiment.
Figure 10:
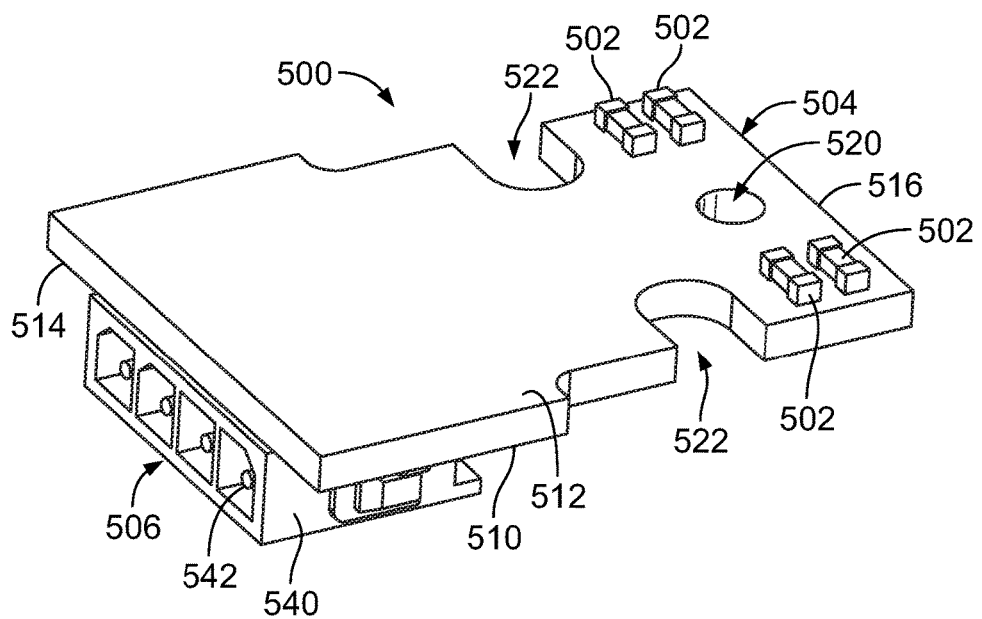
FIG. 10 is a bottom perspective view of the thermal monitoring device of the supply charging device in accordance with an exemplary embodiment.

FIG. 9 is a top perspective view of the thermal monitoring device 500 in accordance with an exemplary embodiment. FIG. 10 is a bottom perspective view of the thermal monitoring device 500 in accordance with an exemplary embodiment. The thermal monitoring device 500 includes a substrate 504, a mating connector 506 mounted to the substrate 504, and the temperature sensors 502 mounted to the substrate 504. In an exemplary embodiment, the temperature sensors 502 are electrically connected to the mating connector 506 via circuit traces, pads, vias, and the like.

The substrate 504 includes an upper surface 510 and a lower surface 512. The substrate 504 extends between a front 514 and a rear 516. The temperature sensors 502 are electrically connected to the mating connector 506, such as via the substrate 504. In various embodiments, the substrate 504 may include a circuit board. In an exemplary embodiment, the substrate 504 includes a locating opening 520 configured to receive the locating post 272 (shown in FIG. 8) to locate the substrate 504 within the thermal monitoring device pocket 270. In an exemplary embodiment, the substrate 504 includes lock openings 522 configured to receive the locking device 228 (shown in FIG. 6). The lock openings 522 are configured to be aligned with the openings 274 in the housing 242.

The temperature sensors 502 may be coupled to the lower surface 512 in various embodiments. For example, the temperature sensors 502 may be soldered to pads on the lower surface 512 of the substrate 504. However, the temperature sensors 502 may be mechanically and electrically connected by other means in alternative embodiments, such as being press-fit to the substrate 504. In various embodiments, the temperature sensors 502 may be thermistors. However, other types of temperature sensors may be used in alternative embodiments.

The mating connector 506 is configured to be mated with an electrical connector 530 (schematically illustrated in FIG. 9), such as a plug connector, a receptacle connector, and the like. The electrical connector 530 may be connected to a control system 532, such as via cables or wires. The control system 532 is used to monitor the temperature, such as for controlling the charging operation. The control system 532 may be used to control the supply charging device 200 based on input from the thermal monitoring device 500, such as the sensed temperature or change in temperature. For example, the charging process may be stopped if the sensed temperature exceeds a threshold temperature. In other various embodiments, the charging rate may be reduced, such as lowering the charging amps or voltage to reduce the temperature of the supply power contacts 220.

The mating connector 506 may be coupled to the upper surface 510 in various embodiments. For example, the mating connector 506 may be soldered to pads on the upper surface 510 of the substrate 504. However, the mating connector 506 may be mechanically and electrically connected by other means in alternative embodiments, such as being press-fit to the substrate 504. Optionally, multiple mating connectors 506 may be provided, such as one for each temperature sensor 502. In an exemplary embodiment, the mating connector 506 includes a housing 540 holding contacts 542. The contacts 542 may be pin contacts, socket contacts, or other types of contacts, such as spring beams. In an alternative embodiment, rather than having the contacts 542 held in the housing 540, the mating connector 506 may be provided without the housing 540, such as including the contacts 542 configured to be electrically connected to an electrical connector.

Figure 11:
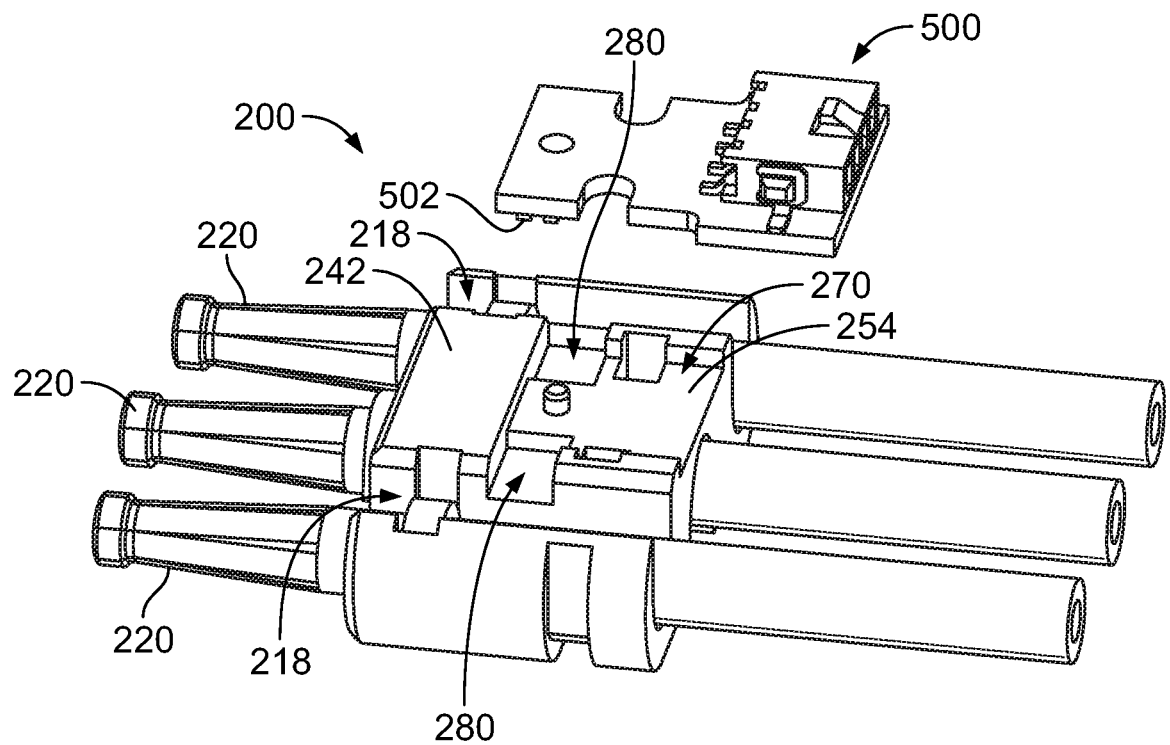
FIG. 11 is a top perspective view of a portion of the supply charging device in accordance with an exemplary embodiment showing the thermal monitoring device.
Figure 12:
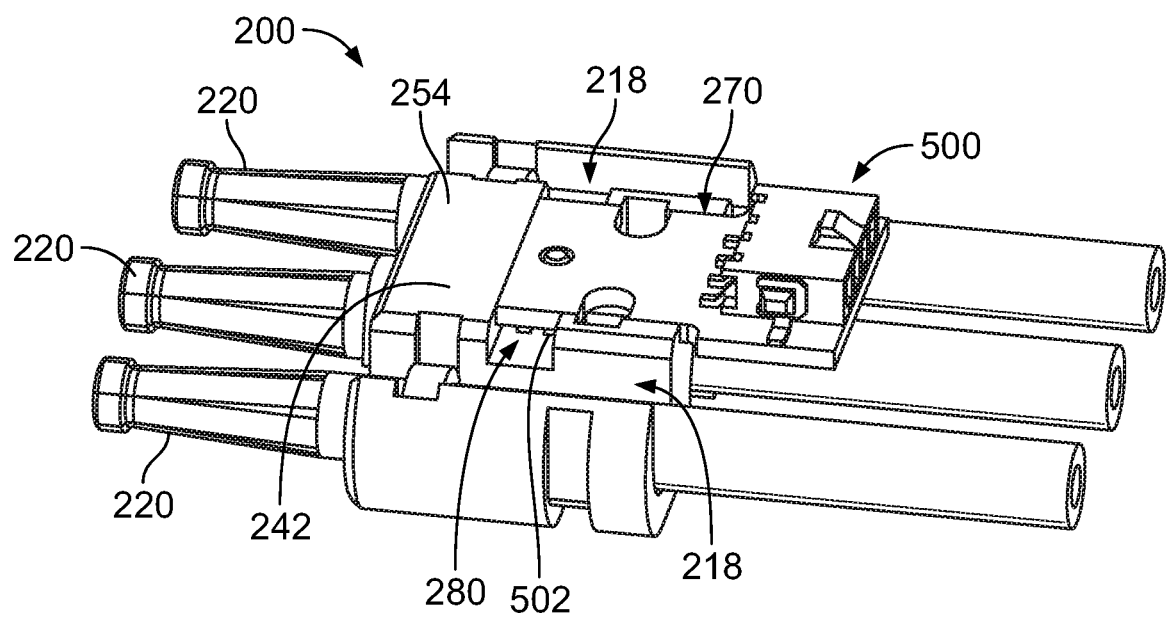
FIG. 12 is a top perspective view of a portion of the supply charging device in accordance with an exemplary embodiment showing the thermal monitoring device.

FIG. 11 is a top perspective view of a portion of the supply charging device 200 in accordance with an exemplary embodiment showing the thermal monitoring device 500 poised for mounting to the housing 242. FIG. 12 is a top perspective view of a portion of the supply charging device 200 in accordance with an exemplary embodiment showing the thermal monitoring device 500 coupled to the housing 242.

In an exemplary embodiment, the housing 242 includes temperature sensor channels 280 located adjacent the supply power contacts 220. The temperature sensor channels 280 receive corresponding temperature sensors 502. The temperature sensors 502 are located in close proximity to the supply power contacts 220 when located in the temperature sensor channels 280. In an exemplary embodiment, the temperature sensor channels 280 are open to the thermal monitoring device pocket 270 at the end wall 254. The temperature sensor channels 280 may be open to the supply power contact channels 218 to sense the temperature of the supply power contacts 220. In various embodiments, the temperature sensors 502 are thermally coupled to the supply power contacts 220, such as by either direct thermal coupling or indirect thermal coupling. In various embodiments, the temperature sensors 502 are indirectly thermally coupled to the supply power contacts through air between the temperature sensor channels 280 and the supply power contact channels 218.

Figure 13:
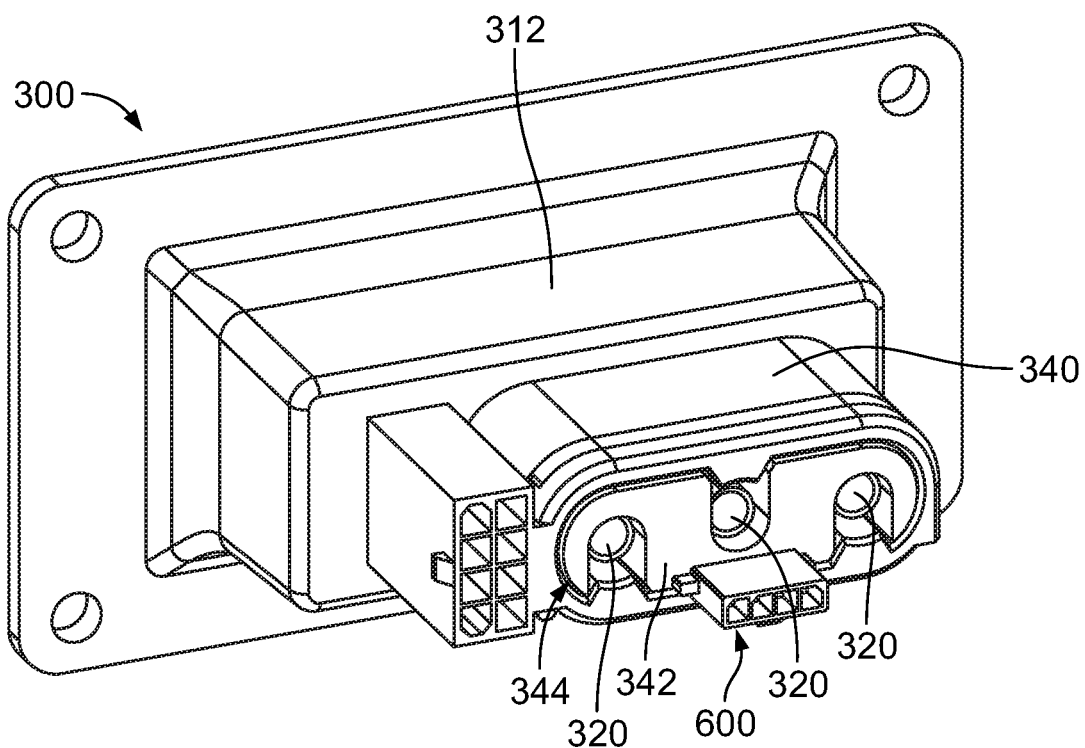
FIG. 13 is a rear view of the mobile charging device in accordance with an exemplary embodiment.

FIG. 13 is a rear view of the mobile charging device 300 in accordance with an exemplary embodiment. FIG. 13 shows the thermal monitoring device 600 coupled to the housing 312 for monitoring the temperature of the receiver power contacts 320. The inner housing 342 is shown in the cavity 344 of the outer housing 340.

Figure 14:
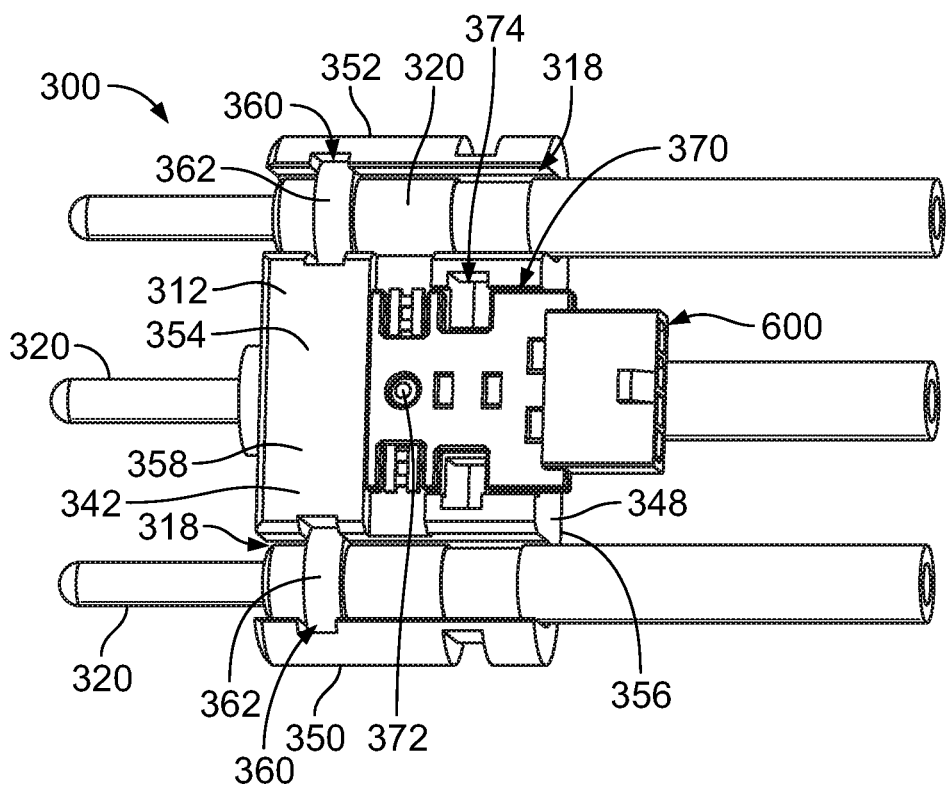
FIG. 14 is a top view of a portion of the mobile charging device in accordance with an exemplary embodiment.

FIG. 14 is a top view of a portion of the mobile charging device 300 in accordance with an exemplary embodiment. FIG. 14 shows the receiver power contacts 320 received in the receiver power contact channels 318 of the receiver housing 312, such as the inner housing 342. The thermal monitoring device 600 is coupled to the inner housing 342 for monitoring the temperature of the receiver power contacts 320.

The housing 312 (for example, the inner housing 342) includes a first side 350 and a second side 352 extending between the front 346 and the rear 348. The housing 312 includes a first end wall 354 and a second end wall 356 extending between the sides 350, 352 and between the front 346 and the rear 348. The first end wall 354 may be a top and the second end wall 356 may be a bottom. In various embodiments, the end wall 354 includes a flat pad 358. The thermal monitoring device 600 is coupled to the end wall 354, such as at the pad 358.

In an exemplary embodiment, the receiver power contact channels 318 include openings open at the end wall 354 to receive the receiver power contacts 320. In various embodiments, the receiver power contact channels 318 are located proximate to the sides 350, 352. In various embodiments, the second end wall 356 may include an opening to at least one receiver power contact channel 318. Such receiver power contact channel 318 may be approximately centered between the sides 350, 352. Other locations of the receiver power contact channels 318 may be possible in alternative embodiments. The receiver power contact channels 318 may include locating features 360 for locating the receiver power contacts 320 in the receiver power contact channels 318. For example, the locating features 360 may be slots or channels that receive a flange 362 of the receiver power contact 320 to axially position the receiver power contact 320 in the receiver power contact channel 318.

In an exemplary embodiment, the housing 342 includes a thermal monitoring device pocket 370 at the end wall 354 that receives the thermal monitoring device 600. The thermal monitoring device pocket 370 may be located at the rear 348. The thermal monitoring device 600 may extend from the thermal monitoring device pocket 370 rearward of the rear 348 of the housing 342. In an exemplary embodiment, the housing 342 includes a locating post 372 in the thermal monitoring device pocket 370 for locating the thermal monitoring device 600 within the thermal monitoring device pocket 370. Other types of locating features may be used in alternative embodiments. For example, shoulders or walls forming the thermal monitoring device pocket 370 may be used for locating the thermal monitoring device 600 in the thermal monitoring device pocket 370. In an exemplary embodiment, the housing 342 includes openings 374, such as between the end walls 354, 356, configured to receive the locking device 328 (shown in FIG. 6).

Figure 15:
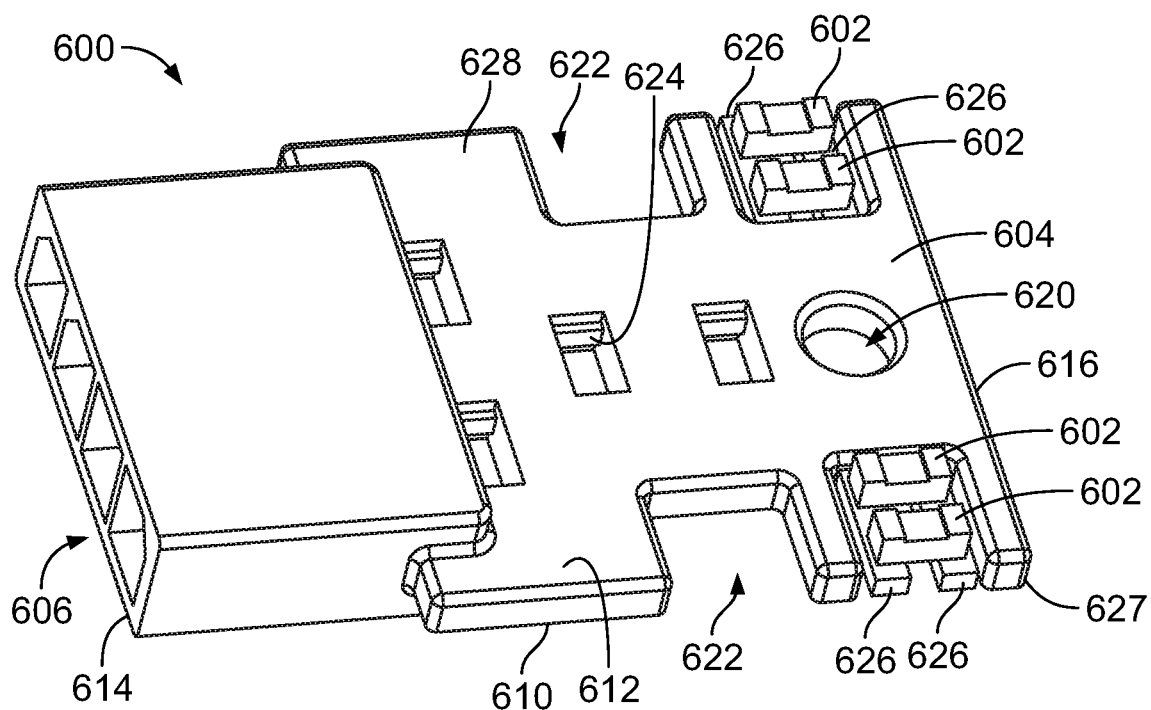
FIG. 15 is a top perspective view of a thermal monitoring device of the mobile charging device in accordance with an exemplary embodiment.
Figure 16:
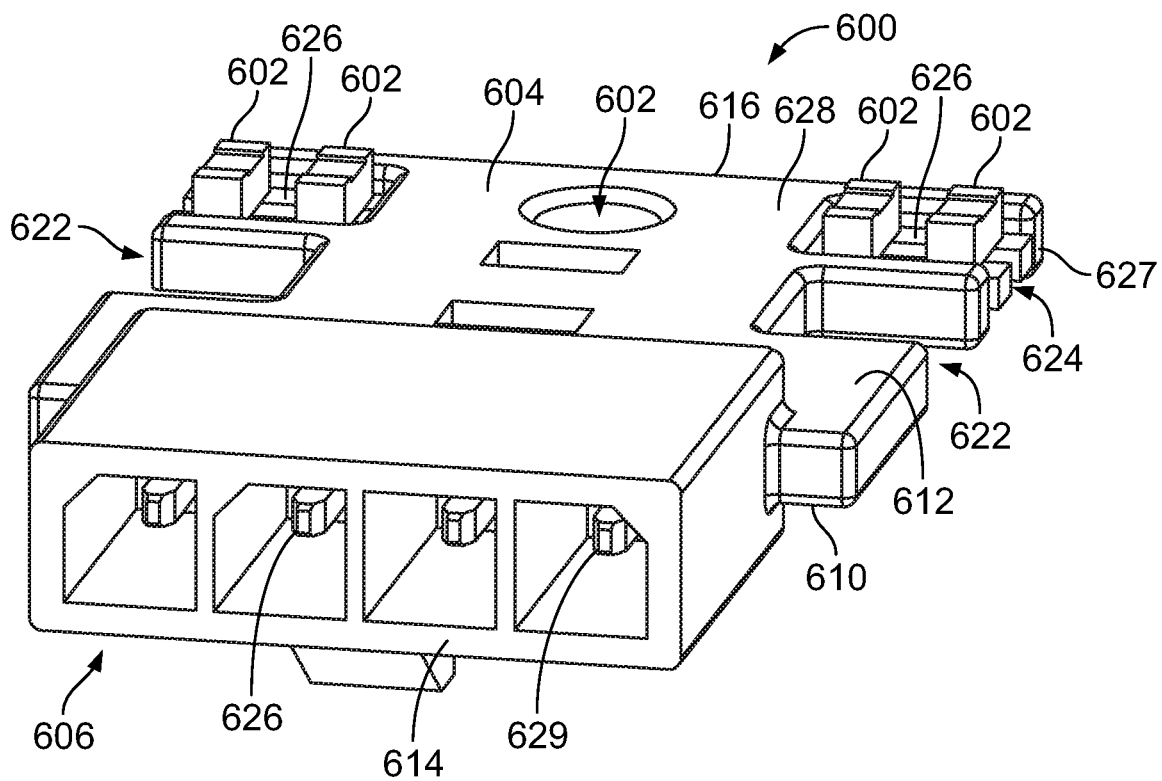
FIG. 16 is a bottom perspective view of the thermal monitoring device of the mobile charging device in accordance with an exemplary embodiment.

FIG. 15 is a top perspective view of the thermal monitoring device 600 in accordance with an exemplary embodiment. FIG. 16 is a bottom perspective view of the thermal monitoring device 600 in accordance with an exemplary embodiment. The thermal monitoring device 600 includes a substrate 604, a mating connector 606 mounted to the substrate 604, and the temperature sensors 602 mounted to the substrate 604. In an exemplary embodiment, the temperature sensors 602 are electrically connected to the mating connector 606 via leads, terminals traces, and the like.

The substrate 604 includes an upper surface 610 and a lower surface 612. The substrate 604 extends between a front 614 and a rear 616. The temperature sensors 602 are electrically connected to the mating connector 606, such as via the substrate 604. In various embodiments, the substrate 604 may include a leadframe 624 having leads 626 hold by a dielectric body 628. In various embodiments, the dielectric body 628 may be an overmolded body that is overmolded around the leadframe 624. Each lead 626 extends between a first end 627 and a second end 629. The temperature sensors 602 are electrically connected to the first ends 627 of the leads 626. For example, the first ends 627 of the leads 626 are exposed in openings or windows in the dielectric body 628 and the temperature sensors 602 may be soldered, welded, or otherwise electrically connected to the leads 626. The second ends 629 of the leads 626 are provided at the mating connector 606.

In an exemplary embodiment, the substrate 604 includes a locating opening 620 configured to receive the locating post 372 (shown in FIG. 14) to locate the substrate 604 within the thermal monitoring device pocket 370. In an exemplary embodiment, the substrate 604 includes lock openings 622 configured to receive the locking device 328 (shown in FIG. 5). The lock openings 622 are configured to be aligned with the openings 374 in the housing 342.

The temperature sensors 602 may be coupled to the lower surface 612 in various embodiments. For example, the temperature sensors 602 may be soldered to the leads 626 at the lower surface 612 of the substrate 604. However, the temperature sensors 602 may be mechanically and electrically connected by other means in alternative embodiments. In various embodiments, the temperature sensors 602 may be thermistors. However, other types of temperature sensors may be used in alternative embodiments.

The mating connector 606 is configured to be mated with an electrical connector 630 (schematically illustrated in FIG. 15), such as a plug connector, a receptacle connector, and the like. The electrical connector 630 may be connected to a control system 632, such as via cables or wires. The control system 632 is used to monitor the temperature, such as for controlling the charging operation. The control system 632 may be used to control the supply charging device 300 based on input from the thermal monitoring device 600, such as the sensed temperature or change in temperature. For example, the charging process may be stopped if the sensed temperature exceeds a threshold temperature. In other various embodiments, the charging rate may be reduced, such as lowering the charging amps or voltage to reduce the temperature of the receiver power contacts 320.

In various embodiments, the mating connector 606 is defined by the dielectric body 628 and the second ends 629 of the leads 626. In other various embodiments, the mating connector 606 may be a separate component coupled to the substrate 604, such as to the upper surface 610. Optionally, multiple mating connectors 606 may be provided, such as one for each temperature sensor 602. In an exemplary embodiment, the mating connector 606 includes a housing 640, which may be defined by the dielectric body 628, holding contacts 642, which may be defined by the leads 626. The contacts 642 may be pin contacts, socket contacts, or other types of contacts, such as spring beams.

Figure 17:
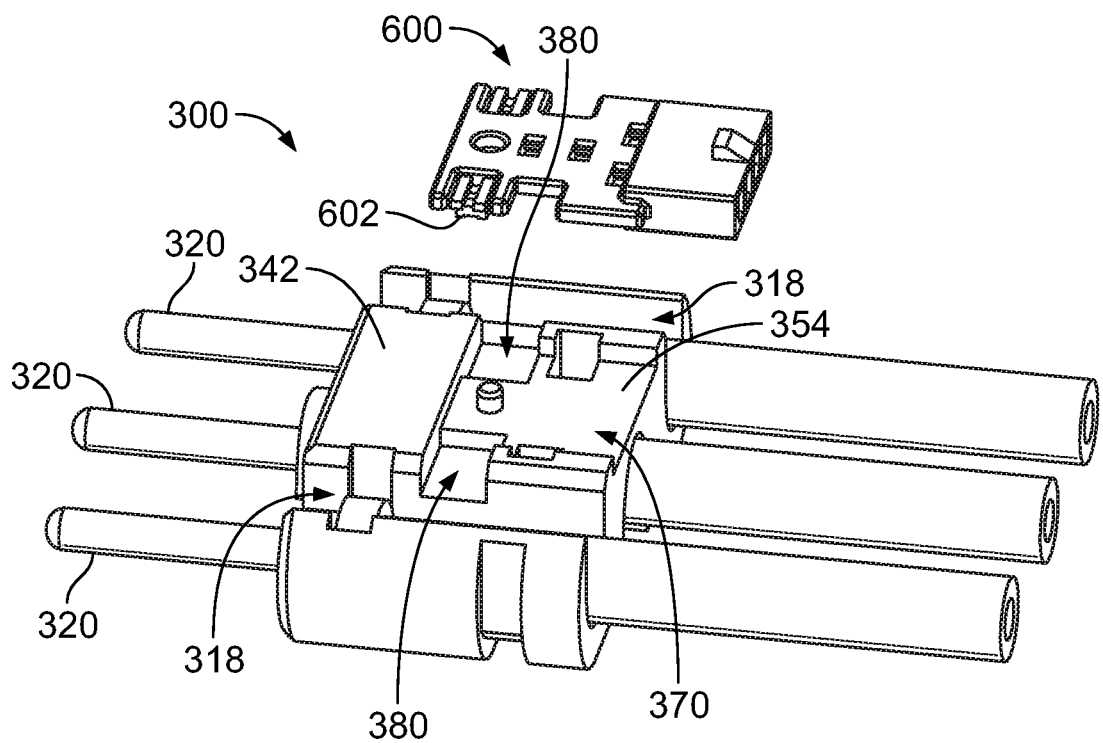
FIG. 17 is a top perspective view of a portion of the mobile charging device in accordance with an exemplary embodiment showing the thermal monitoring device.
Figure 18:
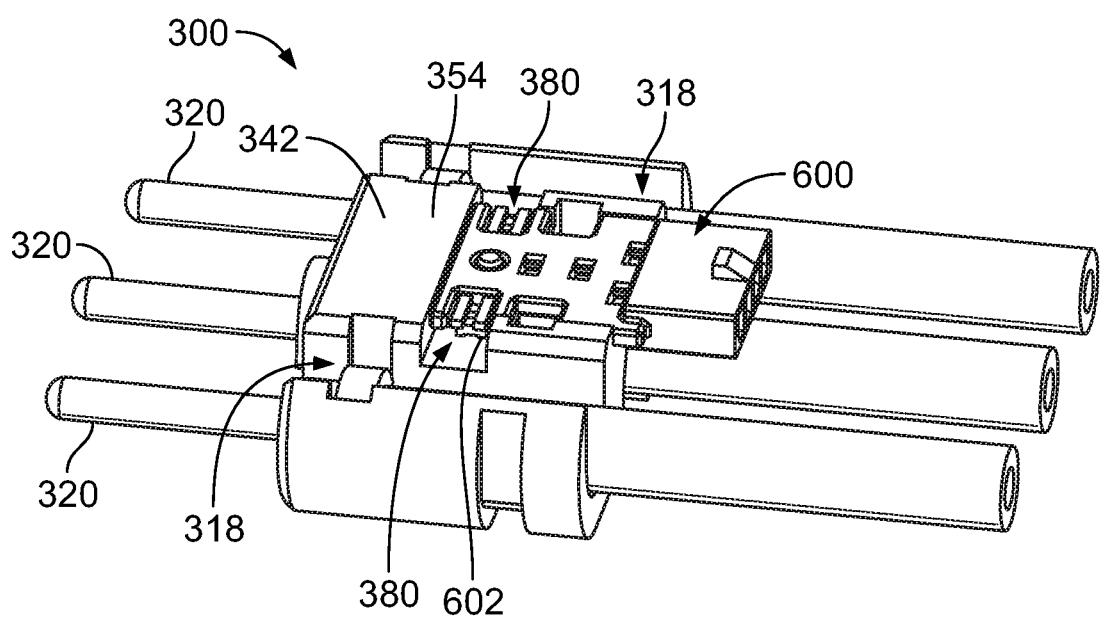
FIG. 18 is a top perspective view of a portion of the mobile charging device in accordance with an exemplary embodiment showing the thermal monitoring device.

FIG. 17 is a top perspective view of a portion of the mobile charging device 300 in accordance with an exemplary embodiment showing the thermal monitoring device 600 poised for mounting to the housing 342. FIG. 18 is a top perspective view of a portion of the mobile charging device 300 in accordance with an exemplary embodiment showing the thermal monitoring device 600 coupled to the housing 342.

In an exemplary embodiment, the housing 342 includes temperature sensor channels 380 located adjacent the receiver power contacts 320. The temperature sensor channels 380 receive corresponding temperature sensors 602. The temperature sensors 602 are located in close proximity to the receiver power contacts 320 when located in the temperature sensor channels 380. In an exemplary embodiment, the temperature sensor channels 380 are open to the thermal monitoring device pocket 370 at the end wall 354. The temperature sensor channels 380 may be open to the receiver power contact channels 318 to sense the temperature of the receiver power contacts 320. In various embodiments, the temperature sensors 602 are thermally coupled to the receiver power contacts 320, such as by either direct thermal coupling or indirect thermal coupling. In various embodiments, the temperature sensors 602 are indirectly thermally coupled to the receiver power contacts through air between the temperature sensor channels 380 and the receiver power contact channels 318.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A charging device for charging a mobile device using a charging component, the charging device comprising:
   a power connector having a housing coupled to the mobile device, the housing extending between a front and a rear wherein the front is exposed at an exterior of the mobile device and the rear is interior of the mobile device, the power connector having a mating end at the front, the housing having an end wall extending between the front and the rear, the housing including power contact channels extending therethrough between the front and the rear, the power connector including power contacts received in the power contact channels, the housing including a guide member at the front located forward of the power contacts, the guide member configured to guide mating between the mobile device and the charging component; and a thermal monitoring device coupled to the end wall of the housing, the thermal monitoring device including a substrate, a mating connector mounted to the substrate, and a temperature sensor mounted to the substrate, the temperature sensor being electrically connected to the mating connector, the temperature sensor being positioned in close proximity with at least one of the power contacts such that the temperature sensor is in thermal communication with the at least one of the power contacts for monitoring the temperature of the at least one of the power contacts.

2. The charging device of claim 1, wherein the temperature sensor includes a thermistor.

3. The charging device of claim 1, wherein the housing includes a temperature sensor channel located adjacent at least one of the power contacts, the temperature sensor being received in the temperature sensor channel.

4. The charging device of claim 3, wherein the temperature sensor channel is open to at least one of the power contact channels holding the corresponding power contacts.

5. The charging device of claim 1, wherein the substrate is a circuit board having circuit traces, the temperature sensor being electrically connected to the circuit traces, the mating connector being electrically connected to the circuit traces.

6. The charging device of claim 1, wherein the substrate includes a leadframe having leads each extending between a first end and a second end, the substrate including a dielectric body holding the leads of the leadframe, the temperature sensor coupled to the first ends of the leads, the second ends of the leads extending to the mating connector.

7. The charging device of claim 1, wherein the housing includes a thermal monitoring device pocket at the end wall receiving the thermal monitoring device.

8. The charging device of claim 1, wherein the housing includes an opening at the end wall, the opening receiving a locking device used to hold the power connector in a mounting structure, the substrate including a substrate opening aligned with the opening in the housing to receive the locking device.

9. The charging device of claim 1, wherein the substrate extends rearward of the rear of the power connector, the mating connector being located rearward of the housing of the power connector.

10. The charging device of claim 1, wherein the power contacts include a first power contact and a second power contact, the temperature sensor being a first temperature sensor, the thermal monitoring device including a second temperature sensor, the substrate being coupled to the housing such that the first temperature sensor is positioned in close proximity with the first power contact and such that the second temperature sensor is positioned in close proximity with the second power contact.

11. A charging system comprising:
a mobile charging device including a receiver power connector having a receiver housing extending between a front and a rear, the receiver power connector having a mating end at the front, the receiver housing having a receiver flange configured to be mounted to a body of a mobile device, the receiver housing having a receiver base extending rearward from the receiver flange through a body cutout in the body of the mobile device, the receiver housing including receiver power contact channels extending through the receiver base, the receiver housing including a funnel having an opening, the funnel having angled guide walls between the opening and a receptacle at the receiver base, the receiver power connector including receiver power contacts received in the receiver power contact channels, the receiver power contacts extending into the receptacle, wherein the funnel is located forward of the receiver power contacts;

a supply charging device including a supply power connector having a supply housing extending between a front and a rear, the supply power connector having a mating end at the front, the supply housing having a supply flange configured to be mounted to a panel of a charging component, the supply housing having a supply base extending rearward from the supply flange through a panel cutout in the panel, the supply housing including supply power contact channels extending through the supply base, the supply housing including a guide member extending forward from the supply flange, the guide member being received in the funnel of the receiver housing through the opening to locate the supply charging device relative to the mobile charging device, the supply power connector including supply power contacts received in the supply power contact channels, the mating end of the supply power connector being received in the receptacle such that the supply power contacts are mated to the receiver power contacts; and a thermal monitoring device coupled to either the receiver base of the receiver housing or the supply base of the supply housing, the thermal monitoring device including a substrate, a mating connector mounted to the substrate, and a temperature sensor mounted to the substrate, the temperature sensor being electrically connected to the mating connector, the temperature sensor being positioned in close proximity with the corresponding receiver power contact or the corresponding supply power contact for monitoring the temperature of the corresponding receiver power contact or the corresponding supply power contact.

12. The charging system of claim 11, further comprising a second thermal monitoring device coupled to the other of the receiver base of the receiver housing or the supply base of the supply housing, the second thermal monitoring device including a second substrate, a second mating connector mounted to the second substrate, and a second temperature sensor mounted to the second substrate, the second temperature sensor being electrically connected to the second mating connector, the second temperature sensor being positioned in close proximity with the corresponding receiver power contact or the supply power contact for monitoring the temperature of the receiver power contact or the supply power contact.

13. The charging system of claim 11, wherein the receiver housing includes a temperature sensor channel located adjacent at least one of the receiver power contacts, the temperature sensor being received in the temperature sensor channel, the temperature sensor channel being open to the receiver power contact channel holding the receiver power contacts.

14. The charging system of claim 11, wherein the supply housing includes a temperature sensor channel located adjacent at least one of the supply power contacts, the temperature sensor being received in the temperature sensor channel, the temperature sensor channel being open to the supply power contact channel holding the supply power contacts.

15. The charging system of claim 11, wherein the substrate is a circuit board having circuit traces, the temperature sensor being electrically connected to the circuit traces, the mating connector being electrically connected to the circuit traces.

16. The charging system of claim 11, wherein the substrate includes a leadframe having leads each extending between a first end and a second end, the substrate including a dielectric body holding the leads of the leadframe, the temperature sensor coupled to the first ends of the leads, the second ends of the leads extending to the mating connector.

17. The charging system of claim 11, wherein the substrate extends rearward of the rear of the power connector, the mating connector being located rearward of the housing of the power connector.

18. An autonomous mobile device comprising:
 a mobile body movable relative to a supply charging device to perform a task and return to the supply charging device to recharge the autonomous mobile device; and
 a mobile charging device mounted to the mobile body, the mobile charging device being mated to the supply charging device to recharge the autonomous mobile device, the mobile charging device including a receiver power connector having a receiver housing extending between a front and a rear, the receiver power connector having a mating end at the front, the receiver housing having a receiver flange mounted to the mobile body, the receiver housing having a receiver base extending rearward from the receiver flange through a body cutout in the mobile body, the receiver housing including receiver power contact channels extending through the receiver base, the receiver housing including a funnel having an opening, the funnel having angled guide walls between the opening and a receptacle at the receiver base, the receiver power connector including receiver power contacts received in the receiver power contact channels, the receiver power contacts extending into the receptacle, wherein the funnel is located forward of the receiver power contacts;
 the mobile charging device including a thermal monitoring device coupled to the receiver base of the receiver housing, the thermal monitoring device including a substrate, a mating connector mounted to the substrate, and a temperature sensor mounted to the substrate, the temperature sensor being electrically connected to the mating connector, the temperature sensor being positioned in close proximity with at least one of the receiver power contacts such that the temperature sensor is in thermal communication with the at least one receiver power contact for monitoring the temperature of the at least one receiver power contact.

19. The autonomous mobile device of claim 18, wherein the receiver housing includes a temperature sensor channel located adjacent at least one of the receiver power contacts, the temperature sensor being received in the temperature sensor channel, the temperature sensor channel being open to the receiver power contact channel holding the receiver power contacts.

20. The autonomous mobile device of claim 18, wherein the substrate extends rearward of the rear of the power connector, the mating connector being located rearward of the housing of the power connector.

* * * * *